US011611500B2

(12) United States Patent
Bahal et al.

(10) Patent No.: US 11,611,500 B2
(45) Date of Patent: Mar. 21, 2023

(54) AUTOMATED NETWORK ANALYSIS USING A SENSOR

(71) Applicant: HEWLETT PACKARD ENTERPRISE DEVELOPMENT LP, Houston, TX (US)

(72) Inventors: Rahul Bahal, Santa Clara, CA (US); Pierre Hugo, Cape Town (ZA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/388,156

(22) Filed: Jul. 29, 2021

(65) Prior Publication Data

US 2023/0031231 A1 Feb. 2, 2023

(51) Int. Cl.
| | |
|---|---|
| *H04L 43/50* | (2022.01) |
| *H04L 43/0876* | (2022.01) |
| *H04L 43/0888* | (2022.01) |
| *H04L 67/02* | (2022.01) |
| *H04L 43/0852* | (2022.01) |
| *H04L 43/55* | (2022.01) |
| *H04L 67/50* | (2022.01) |

(52) U.S. Cl.
CPC .......... *H04L 43/50* (2013.01); *H04L 43/0852* (2013.01); *H04L 43/0876* (2013.01); *H04L 43/0888* (2013.01); *H04L 67/02* (2013.01); *H04L 43/55* (2022.05); *H04L 67/535* (2022.05)

(58) Field of Classification Search
CPC ..... H04L 43/50; H04L 43/55; H04L 43/0888; H04L 43/0852; H04L 43/00; H04L 43/02; H04L 43/04; H04L 43/08; H04L 43/0876; H04L 43/20; H04L 67/535; H04L 67/02
See application file for complete search history.

(56) References Cited

U.S. PATENT DOCUMENTS

| | | |
|---|---|---|
| 6,725,174 B2 | 4/2004 | Bouts et al. |
| 6,928,591 B2 | 8/2005 | Grinchuk et al. |
| 7,308,049 B2 | 12/2007 | Goldstein et al. |
| 7,884,820 B2 | 2/2011 | Zhou et al. |
| 10,360,509 B2 | 7/2019 | Osogami |

(Continued)

FOREIGN PATENT DOCUMENTS

WO WO-2014040633 A1 3/2014

*Primary Examiner* — Glenton B Burgess
*Assistant Examiner* — Rachel J Hackenberg
(74) *Attorney, Agent, or Firm* — Hewlett Packard Enterprise Patent Department

(57) ABSTRACT

An example method may include blocks to initiate a network performance analysis on the enterprise network; and receive a translated recording from a backend computing device to be executed as part of the network performance analysis. Additional blocks may add the translated recording to a set of tests in a queue to be executed on the enterprise network; and execute a primary set of low-level instructions of the translated recording using a headless browser. Further blocks may in response to a failed result of the primary set of low-level instructions, execute an alternative set of low-level instructions using the headless browser. Furthermore, blocks may, record, in an activity log, results of executing the translated recording, including at least a total execution time of the executed low-level instructions; and upload the activity log to the backend computing device.

12 Claims, 6 Drawing Sheets

(56) References Cited

U.S. PATENT DOCUMENTS

| | | | |
|---|---|---|---|
| 10,567,548 B2 | 2/2020 | Kakaraparthi | |
| 2007/0211696 A1* | 9/2007 | Noble | H04L 43/50 370/352 |
| 2011/0289489 A1* | 11/2011 | Kumar | G06F 11/3664 717/135 |
| 2013/0132833 A1* | 5/2013 | White | G06F 3/048 715/704 |
| 2015/0263893 A1 | 9/2015 | Aiexis et al. | |
| 2019/0163515 A1 | 5/2019 | Kakaraparthi | |
| 2020/0133829 A1* | 4/2020 | Zazo | G06F 11/3692 |
| 2020/0204442 A1 | 6/2020 | Qureshi et al. | |
| 2020/0334301 A1* | 10/2020 | Walters | G06N 20/00 |
| 2022/0156168 A1* | 5/2022 | Panikkar | G06F 11/277 |

\* cited by examiner

| Desired Network | SSID | Sensor Name | Sensor Serial | Service | | | Status |
|---|---|---|---|---|---|---|---|
| | Analysis | | | Type:WebApp | | | |
| Interface | | Seconds | Status | Message | Task | Target | |
| Wi-Fi | | 0.0 | OK | Wi-Fi Associated | Wi-Fi Association | | − |
| | | 0.5 | info | Detailed DHCP Lease Info | DHCP Lease | | + |
| | | 10.2 | OK | Host is Responding | Host, ICMP Ping | | + |
| | | 19.5 | FAIL | Target failed to run | Web Application | hpe.com | + |

| 502 | 504 | 506 | | |
|---|---|---|---|---|
| 19.5 | FAIL | Target failed to run | Web Application | ▬ |
| | | Timing | | |
| | | Timestamp | | |

508 — RAW OUTPUT

Starting web application test | base URL is 'https://www.hpe.com'

Running test 'HPE on FF'
   running command 'open' | trying target '/' | command succeeded after 10.24 seconds
   running command 'setWindowSize' | trying target '1441x846' | command succeeded after 1.00 seconds
   running command 'click' | trying target 'id=banner-sign' using strategy 'id' |command succeeded after 7.49 seconds
   running command 'click' | trying target 'css=img' using strategy 'css:finder' | error: Element is not clickable at point (X,Y) because another element obscures it
                             | trying target 'xpath=//img' using strategy 'xpath:position' | error: timeout ERROR: all targets failed for command 'click'

FIG. 5

AUTOMATED NETWORK ANALYSIS USING A SENSOR

BACKGROUND

Network experience sensors, such as HPE's User Experience Insight (UXI) sensors, provide a way to extend network analytics and provide service assurance to the end-user. Network experience sensors are deployed at various locations of the end user infrastructure (e.g. different floors of the building, different offices, etc.). Information gathered form the sensors is used by support engineers to perform network and web application tests on location without physically being there. The sensor is generally capable of testing a web server by checking for port availability, SSL certificates, and HTTP status codes, among other things. These tests are well adapted for measuring and correlating the performance of the network in general with the performance of a particular service or application. The sensor mimics end-users' behavior by simulating a client and interacting with the network. Capturing information about such network interactions enables analysis and validation of network health for internal services (e.g. printing services, badge-in services, etc.) and external applications (e.g. webmail, customer relationship management (CRM), etc.) across both wireless and wired networks. The sensor also provides information that can be used to identify the source of any problems by triaging the issue and determining the root cause automatically, which is particularly useful when conducting remote deployments. Support engineers can build network testing procedures based on real-world end-user interactions with certain internal services and external applications to gather information about how an end-user's experience would be using the same services and applications.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 4 is an example of a graphical user interface (GUI) illustrating a collapsed view of a network analysis;

FIG. 5 is an example of a graphical user interface (GUI) illustrating an expanded view of a network analysis;

Figure 1:
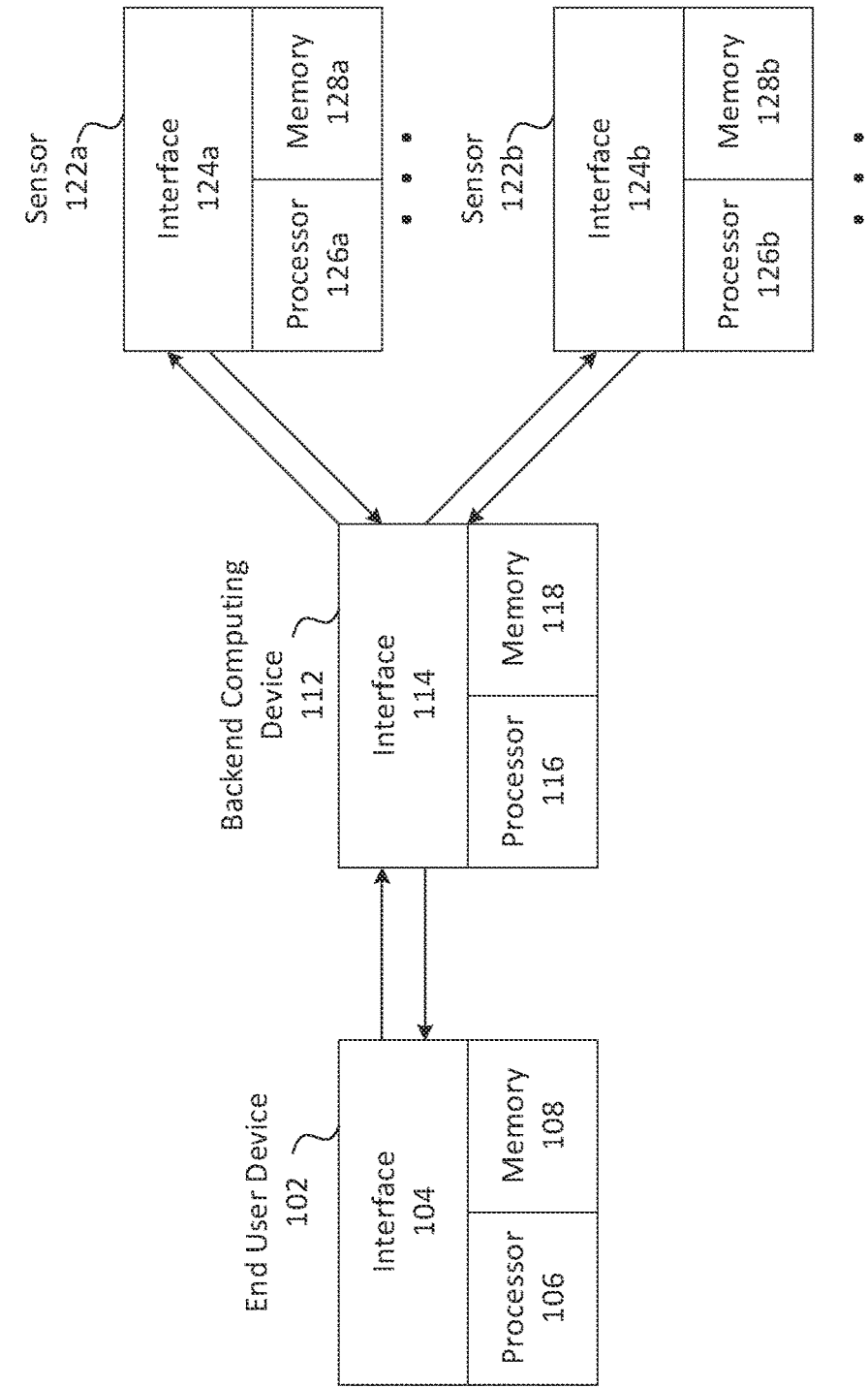
FIG. 1 illustrates an example of an environment including a network of interconnected end user devices, a backend computing device, and sensors.

Certain examples have features that are in addition to or in lieu of the features illustrated in the above-referenced figures. Certain labels may be omitted from certain figures for the sake of clarity.

DETAILED DESCRIPTION

Although testing procedures that are manually built by support engineers are capable of gathering substantial analytic information about a network, there are some practical difficulties associated with building and deploying these templates. A support engineer is required to build these procedures, which is a large amount of effort and requires a sophisticated understanding of networking principles. User interactions with some services and applications are complex and difficult to manually replicate, causing a deviation between the user's experience and the sensor's experience. This deviation can also render impossible the collection of granular data that is useful in analyzing stages of an application flow. Without such granular data, root cause analysis may be substantially more difficult to accomplish.

Since support engineers may not have direct access to a user's environment, they often face challenges translating user requests into parameters for a testing procedure (e.g. test case, test routine). The examples described in this disclosure streamline the process and improve the translation accuracy from user experience to testing procedure. Furthermore, due to the nature of the sensor's environment, a backend computing device (e.g. computing resources located at a core site of an enterprise network or in a cloud system) may be better suited to quickly, efficiently, and globally translate, modularize and deploy the testing procedures.

An example consistent with this disclosure records a user's web application flow using a capture solution (e.g. a browser extension, plugin, addon, or any other type of executable package) installed on the user's device. The recording captures an actual user's interactions with the web application which can later be reproduced on a sensor, such as a network experience sensor. To reproduce the recording on the sensor, backend computing device first partitions the recording into discrete actions and then translates these actions one-by-one into sensor compatible commands. These sensor compatible commands are then transmitted to the sensor.

Backend computing device, which may be provided to the end user as-a-service, the sensor solves these problems by allowing a user to upload flow recordings made with a capture solution, translate the received recording into sets of low-level instructions suitable for use by a sensor within a network, and communicate results of the test procedure back to the user and/or to a support engineer. The backend computing device partitions the recording into discrete actions and translates these actions for use by sensors. The backend computing device assembles testing procedures in a modularized fashion, wherein each module includes a primary instruction and a set of alternatives. Such an approach enhances resiliency to testing procedure failure by providing the ability to select an alternative instruction to replace a failed primary instruction when necessary.

Examples consistent with this disclosure improve the technical field of network analysis and testing, specifically in the subfield of user experience analysis using sensors, such as network experience sensors. Examples of this disclosure improve the ability of sensors (e.g. network experience sensor, IoT (Internet of Things) device or any other software defined or hardware based device capable of collecting and transmitting data consistent with the current disclosure) by, among other things, reproducing a testing procedure recorded by an end user while only using limited computing resources of an end-point device. This efficient use of limited computing resources is achieved without a need for specialized knowledge or involvement of the support engineers to hardcode testing procedures. Additionally, examples of this disclosure improve the representation of the actual user experience in the testing procedures due to the backend computing device partitioning the recordings into discrete actions and translating those actions into a form usable by the sensors. Such an approach provides resiliency to testing procedure failure due to the modularized way the testing procedures are assembled and the ability to select an alternative implementation of any action to replace a failed implementation when necessary. Examples of this disclosure further reduce the amount of time and effort required by support engineers to test users' network experience as the main burden is shifted to the automatic processes executed by the backend computing device. Examples of this disclosure additionally improve the ability of an end user and/or support engineer to interact with a user dashboard (or any other type of user interface e.g. GUI), by providing comprehensive web application testing interface, displaying various performance metrics and allowing the end user and/or support engineer to run recorded web application flows on desired networks.

FIG. 1 illustrates an example of a network analysis environment 100 including a network of interconnected end user devices 102, a backend computing device 112, and sensors 122. One technical complexity when programming testing procedures is the integration of three environments: an end user environment 102 (e.g. a user's device), a backend environment 112 (e.g. a computing device for storing, transforming, and serving recorded tests), and an end point environment 122 (e.g. a network experience sensor).

End user device 102 includes interface 104, processor 106, and memory 108. End user device 102 may be located on an end user network and have access to the backend computing device 112 via interface 104. Access may be provided via WAN (Wide Area Network), LAN (Local Area Network), or any other type of network connection. End user device 112 may display a graphical user interface for the user to send commands, receive data or otherwise interact with the backend computing device 112. While only one end user device is depicted in the example environment 100, user may have plurality of devices connected to the backend computing device 112. Various end user devices may be connected to the backend computing device 112 via various networks and may have different capabilities. In the present disclosure end user device 102 is used by the user to record a web application flow. A user may also utilize the end user device to access test results (e.g. via GUI as shown on FIG. 4 and FIG. 5) once testing procedure is completed.

Web application, as used herein, refers to any type of web-based interface used to carry out specific tasks via web browser or similar software. Examples of web applications include webmail, webapps, online office, web players, and any other web-based applications. Web application flow, as used herein, refers to network traffic, session information, and other information generated and transacted during a user's interaction with a web application. User interaction, as used herein, refers to opening web pages, user Input/Output (I/O) actions, user navigation, executing various commands, or any other user actions. For example, web application flow of a user performing a search query on a search provider website may result in a flow including a plurality of actions, e.g. entering a web address, resolving DNS request, navigating to the search provider page, entering a search string, clicking "search" button, resolving results page, and any other actions that may be a part of the flow. End user device 102, may have a list of instructions loaded in its memory 108 to configure the processor 106 to enable user to easily record such a flow before it can be uploaded for further processing to the backend computing device 112.

Backend computing device 112 (e.g. a server) includes interface 114, processor 116, and memory 118. Backend computing device 112 may be located on premises (e.g. in a server room at headquarters), at a datacenter, in the cloud, or any other suitable environment. Backend computing device 112 may have a connection to an end user network, sensor 122 network, and any other networks needed for proper communication and data transfer. A connection may be in a form of a direct connection, VPN (Virtual Private Network) connection, SDWAN (Software Defined Wide Area Network) connection, wired connection, wireless connection, or any other suitable connection. A connection may be established and maintained via an interface 104. Backend computing device 112 may have compute, store, process or any other capabilities required to receive, process, or output results of user requests. An example of a backend computing device may be a hybrid infrastructure receiving recorded flow from an end user device, performing processing, such as translating the flow, and communicating with various sensors consistent with the present disclosure. While only one end user device and two sensors are depicted in the example environment 100, a plurality of end user devices and sensors may be connected to the backend computing device 112 via various networks and may have ranging capabilities. As can be appreciated by a person having ordinary skill in the relevant art, environment 100 may be an enterprise network, including end user devices 102 and sensors 122 located in campus or branch networks and backend computing device 112 located in a headquarters or other core network. While sensors 122 are depicted in FIG. 1 as being separate from end user device 102, it is contemplated that end user devices 102 and sensor 122 could be deployed in any configuration, including being collocated on the same local network. As described later in the disclosure, particularly with a reference to FIG. 2 backend computing device plays a core role in the network analysis process.

Sensors 122 (a, b, . . . , n) (e.g. sensors) include interface 124, processor 126, and memory 128. Sensors 122 may be located at various locations within environment 100 based on network requirements. For example, sensor 122a may be located at a headquarters location of an enterprise, and sensor 122b may be located at a satellite office of the enterprise. Sensors 122 may maintain a persistent or a non-persistent connection with backend computing device 112. Connection may be maintained via interface 124 and may be in a form of a direct connection, VPN connection, SDWAN connection, wired connection, wireless connection, or any other suitable connection. Persistent connection, as used herein, refers to network communication channel that remains open. Non-persistent connection, as used herein, refers to network communication that may be interrupted, established on-demand, or otherwise maintained in a non-persistent manner.

Sensors 122, as used herein, may be a network experience sensor (e.g. HPE User Experience Insight (UXI) sensor), a low power device, an IoT (Internet of Things) device, or any other software defined or hardware based device capable of collecting and transmitting data. Network experience sensor, as used herein, refers to a device capable of mimicking end-user behavior by simulating a client and the interactions it would perform with the network. A low powered device, as used herein, refers to a device specifically designed for lower power consumption compared to typical servers or network equipment. An IoT device, as used herein, refers to a piece of hardware, such as a sensor, an actuator, a gadget, an appliance, or any other machine, that is programmed for a certain application and can transmit data over the internet or other networks. Sensors 122 may be a mobile device, industrial equipment, environmental measurement equipment, medical device, or any other equipment. Sensors 122 may also be software components executing on any such equipment. As described later in the disclosure, particularly with a reference to FIG. 3 sensors play a core role in the network analysis process.

Figure 2:
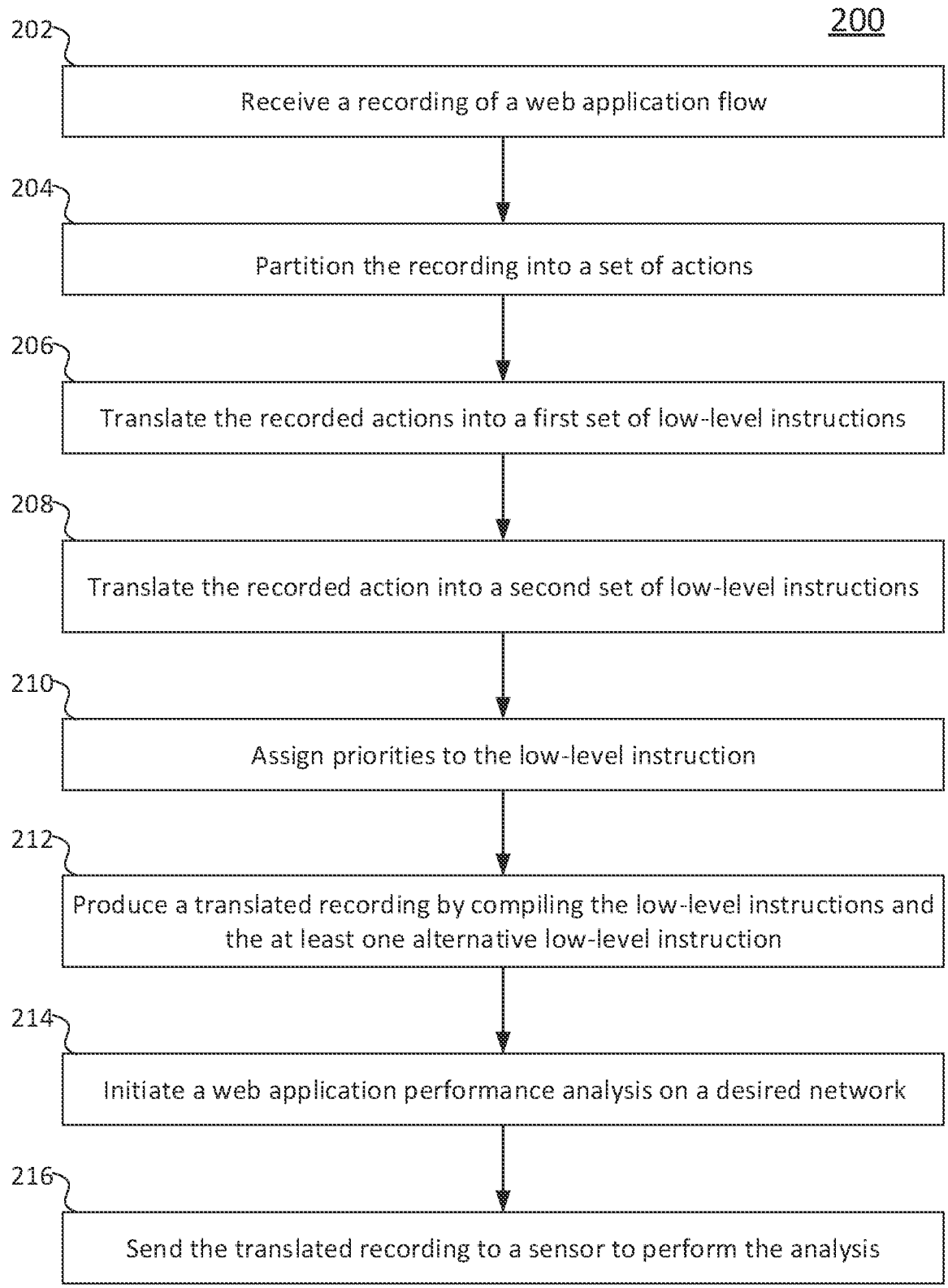
FIG. 2 is a flowchart illustrating an example of a method for network testing.

FIG. 2 is a flowchart illustrating an example of a method for network testing 200. In some examples, method 200 may be encoded as instructions in a non-transitory computer readable medium (e.g. memory) and executed on a backend computing device (e.g., backend computing device 112 in FIG. 1, etc.).

In block 202, the backend computing device receives a flow recording from an end user. Flow recording may be a web application flow recording, as shown on the example method 200. Flow recording, as used herein, is a list of consecutive actions recorded by an end user. One example of the flow recording is a web application flow recording. Various recordation tools may be used to produce the initial recording. An end user device communicates with a backend computing device to transmit the recording via respective network interfaces. In some examples, communication may be encrypted (e.g. SSL (Secure Sockets Layer), etc.). Any suitable type of a network communication protocol (e.g. TCP/IP (Transmission Control Protocol/Internet Protocol), etc.) may be used to communicate/transmit the recording. In some examples, the backend computing device may perform error checking to verify the recording. Error checking may be used to confirm that the recording is transmitted completely, without errors, executable, or otherwise reproducible by the backend computing device.

In block 204, the backend computing device stores the flow recording. The recording may be stored in object storage, file storage, block storage, or any other suitable storage format within the infrastructure. The stored recording may be directly accessible by a sensor. The backend computing device may utilize single-file flat, multifile relational structured, or any other of suitable database types to store the recording. In some examples, after method 200 is complete, the stored recording may be retained for further analysis, moved to a cold storage, archived, removed or otherwise disposed of.

In block 206, the backend computing device translates the recording into sets of low-level instructions. In some examples the recording may be parsed into individual actions and each action may be translated to a set of low-level instructions. Translation may be performed by cross referencing recording actions with available low-level instructions. Each translated action may contain a plurality of low-level instructions. For example, an action of navigating to a certain page within a web application may be translated to a set of low-level instructions specifying cursor movement through the menus and activating a specified item. In one example, a single action of displaying a filtered result may be translated to a set of low-level instructions specifying selection of each filter parameter as a user would have done it. In an alternative example, a single action may translate to a single low-level instruction, such as a page refresh. Accordingly, a low-level instruction may include any number of machine readable instructions, including instructions to generate and transmit any number of network messages as is useful to accomplish the associated action. In some examples, these sets of low-level instructions may each closely follow the individual actions as recorded by the user. In such examples, these sets of low-level instructions may be characterized as original sets of low-level instructions. In other examples, these sets of low-level instructions may take a different set of actions compared to the original flow recording; however, the result will remain substantially the same as the original flow recording. In either example, low-level instructions generated in block 206 that translate an individual action may be characterized as a "first set" of low-level instructions.

Since support engineers may not have direct access to a user environment, they often face challenges translating user complaints or requests to proper testing procedures; the examples described in this disclosure streamline the process and improve the translation accuracy from the user experience to the testing procedure.

When translating the recording, it is important to ensure that the sensor is not unintentionally executing malicious code when running tests. The sensor that is expected to run the test could otherwise be potentially open to attacks such as interacting with a malicious website, downloading malware or otherwise executing undesired code that could impact the sensor's functionality and/or compromise the network more broadly. By translating actions into low-level instructions, the backend computing device ensures that no hidden malicious blocks are included in the recorded flow.

Low-level instructions, as used herein, may refer to instructions executable or otherwise reproducible by an end-point device. In some examples, low-level instructions may be in a form of a low-level programing language (e.g. assembly, etc.). Original actions received from the end user may be in a form of a high-level programming language (e.g. Python, etc.). High-level programming language, as used herein, refers to any type of scripting or generally a programming language with strong abstraction from the details of the computer. Low-level programing language, as opposed to high-level language provides little or no abstraction from a computer's instruction set architecture.

In block 208, alternative sets of low-level instructions are formulated by the backend computing device. One of these alternate sets may be characterized as a "second set" of low-level instructions (another alternate set may be characterized as a "third set", and so on.) Some recorded action may translate to low-level instruction in a plurality of ways, because some low-level instructions may have alternatives available. For example, navigation may be translated to low-level instructions specifying cursor movement and a mouse click or alternatively, low-level instructions specifying keyboard shortcuts and an "enter" button. In some examples, Alternative low-level instructions may take a different set of actions compared to the first set of low-level instructions; however, the result will remain substantially the same as the first set of low-level instructions. For example, the recorded action may be cursor movement and mouse click. A first set of low-level instructions may specify cursor movement and a mouse click while a second set of low-level instructions may specify keyboard shortcuts and an "enter" button. The result is navigation to a specific page, but the instructions are different. Alternative sets of low-level instructions may include additional metadata specifying overall viability of such an alternative. Overall viability may depend on execution time, expected success rate, or any other comparative metric between the sets of low-level instructions. Sets of low-level instructions may be scoped differently from each other. Differently scoped, as used herein, refers to instructions of different nature that may provide same result. For example, narrow scoped instructions may specify curser movement and execution, while broad scoped instructions may specify direct URL manipulation. As another example, narrow scoped instructions may access a webpage element using the element ID and broad scoped instructions may access a webpage element using an element class. The backend device may formulate one or more alternative sets of low-level instructions for each primary set of low-level instructions depending on how many alternative paths may be performed to achieve same result.

In block 210, priority is assigned to the sets of low-level instructions by the backend computing device. Priority may be based on likelihood of success, execution time or any other comparative metric between the sets of low-level instructions. Likelihood of success, as used herein refers to a compound metric reflecting overall viability of an alternative, wherein viability is a probability of the instructions receiving an expected (e.g. success) response from the network when executed. The backend computing device may analyze viability metadata of the sets of low-level instruction to determine a priority metric for each sets of low-level instructions. In one example, sets of low-level instructions that take less time to execute will be granted priority over other sets. In another example, a set of low-level instructions with the highest success rate will be assigned a higher priority than other sets. In other examples, any combination of the factors may be used to determine likelihood of success of sets of low-level instructions. In one example, a higher priority may be assigned to the first set of low-level instructions and a lower priority to the second set of low-level instructions based on respective likelihoods of success. In some examples, there may be different rounds of priorities that are based on different criteria. For example, a first round of priority assignment may be based on how closely a set of low-level instructions follow an action of the original flow recording. For example, an original set of low-level instructions may be assigned a highest priority because it most closely follows the actions of the original flow recording as compared to other alternate set of low-level instructions. In these examples, other alternate sets may then be assigned priorities relative to each other based on the factors discussed above.

In block 212, the backend computing device produces a final (e.g. translated) recording by compiling the sets of low-level instructions that were translated of recording of the web application flow. In some examples, the final recording may include all of the sets of low-level instructions. In some examples, the final recording may include some of the sets of low-level instructions, including the first set of low-level instructions and the second set of low-level instructions. The final recording may indicate a set of low-level instructions (e.g., the first set) as being a "primary set" of low level instructions and another set of low-level instructions (e.g., the second set) as being a "secondary set" of low-level instructions based, in part, in an order of priority determined in block 210. The primary set may be the set that is assigned highest priority of all the sets (as determined in block 210) and the secondary set may be the set that is assigned the second-highest priority. Additional sets of low-level instructions (e.g., a third set, a fourth set, etc., as discussed above) may also be included in the final recording. These additional sets may be indicated in the final recording as having lower priorities than the primary and/or secondary sets based in an order of priority determined in block 210. Translated recording, as used herein, refers to an output of the backend computing device resulting from processing a flow recording received from the end user device. In one example, the translated recording may be in a form of a single executable. In an alternative example, the translated recording may be in a form of a list containing all sets low-level instructions associated with the actions of the recording. In some examples, the translated recording is saved and may be reused for future testing. In certain examples, the translated recording may be analyzed to enhance processing of the future translation, e.g. reducing computational costs, reducing processing time and identifying other inefficiencies by reusing determined low-level actions and alternatives.

In block 214, the backend computing device initiates a performance analysis related to the recorded flow on a desired network. A web application performance analysis, as used herein, refers to a testing procedure designed to analyze performance of a selected web application or any other type of testing procedure. Desired network, as used herein, refers to any network where at least one of the sensors is located. Sensors may have information related to the desired network. In one example, the backend computing device may enhance the translated recording by receiving network specific information relating to the desired network from a sensor. For example, a sensor may transmit information to the backend computing device identifying peak usage times so that the backend computing device can run testing procedures during off-peak hours or simulate stress tests similar to peak hour loads. In another example, sensor may transmit to the backend computing device network configuration information (e.g. IP address) of key infrastructure components (e.g. access points) of the desired network.

In some examples, multiple sensors may be located on the same network. In alternative examples, individual sensors may be connected to multiple networks. As can be appreciated by a person having skill in the relevant art, the particular network topology does not impact the features taught by this disclosure. Testing procedure may be initiated on any sensor/network combination. For example, if multiple sensors are connected to the same network, tests may be performed from multiple points of the network, e.g. different floors in the building. Alternatively, if a single sensor is connected to multiple networks, same test may be queued to run on all the applicable networks based on the instructions received from an end user and/or support engineer. In the example method 200, web application performance analysis is illustrated. Web application performance analysis, as used herein, refers to a testing procedure geared to gather performance metrics from a web application. Performance metrics may include loading time, response time, execution time, response status, success or failure of a request, or any other quantitative measurements.

In block 216, the backend computing device, transmits the translated recording to the sensor located at the desired network location to perform testing procedure. The backend computing device may transmit the translated recording as a single file or per instruction. Per instruction transmission may be beneficial to the sensor with limited resourced, improving testing procedure execution time removing the need for the sensor to extract the single file into separate lo-level instructions. The sensor may cache the translated recording and reproduce the testing procedure multiple times on a single network, or on various networks as specified by an end user and/or support engineer.

Example method 200 illustrates a method for network testing, the method may comprise a plurality of blocks which may be encoded as instructions in a computer readable medium and executed on a backend computing device. Blocks may include partitioning the recording into a set of actions, each action describing how the end user device performed a stage of the flow, and translating an action of the set of actions into a first set of low-level instructions capable of being executed by a sensor. Additional blocks may include translating the action into a second set of low-level instructions capable of being executed by the sensor, and assigning a higher priority to the first set of low-level instructions and a lower priority to the second set of low-level instructions based on respective likelihoods of success. Further blocks may include producing a translated recording including the first set of low-level instructions as a primary set and the second set of low-level instructions as a secondary set, wherein the first set is included as the primary set based, in part, on the assigned higher priority. Furthermore, blocks may include initiating a network performance analysis on the network, wherein the network performance analysis includes a test performed by executing the translated recording; and sending the translated recording to the sensor to be executed as part of the network performance analysis.

With reference to method 200, the web application flow may be a representation of a user interaction with a web application. The recording is formatted in a high-level programming language; and the first and second sets of low-level instructions are formatted in a low-level programming language. Actions may be in a form of an input action, a navigation action, a refresh action, a click action, or any other action representing user interaction. As used herein, input actions refer to filling out a form, making a selection, uploading a file, or any other input. As used herein, a navigation actions refer to changing pages, scrolling, zooming, or any other navigation. As used herein, click actions, refer to mouse click, touch pad click, touch screen tap, or any other intentional interaction. The backend computing device may be a cloud infrastructure. The sensor may be an IOT device. The low-level instructions may be written in a low-level programming language. Sending the translated recording may be performed on a per-instruction basis. The partitioning instructions may include blocks for parsing the recording to determine individual actions; and recording start and end points of the individual actions. The translating instructions may include blocks for determining a result of the action; and producing a low-level action or a combination of low-level action producing the result. The likelihood of success may be a compound metric reflecting overall viability of the low-level instruction. In some examples, the translated recording may include at least two sets of instructions: a primary set and a secondary set. In some examples, the translated recording may include one primary set and multiple alternate sets of low-level instructions (including a secondary set).

Figure 3:
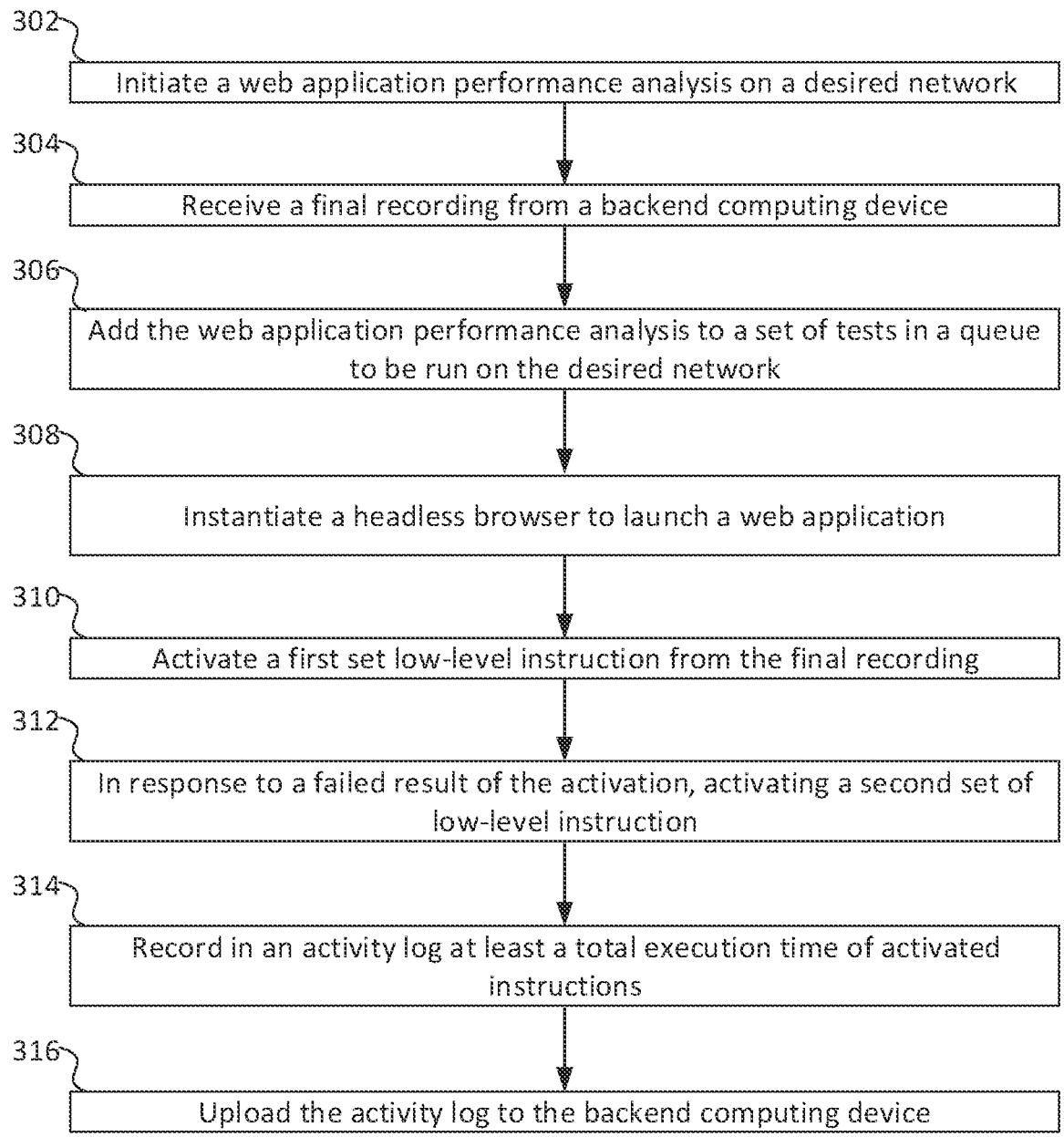
FIG. 3 is a flowchart illustrating an example of a method for a sensor.

FIG. 3 is a flowchart illustrating an example of a method for web flow reproduction 300. In some examples, method 300 may be encoded as instructions in a computer readable medium and executed on a sensor (e.g., sensor 112a of FIG. 1, etc.).

In block 302, in response to block 214 of FIG. 2, the sensor initiates a performance analysis, or any other testing procedure related to the recorded flow on a desired network. Initiation may cause the sensor on the desired network to provide additional information needed for testing procedure to the backend computing device. Initiation illustrated by block 302, may also include instructions that prepare the sensor to perform testing procedures. Instructions may include sensor status check, sensor connectivity verification, queue validation, or any other preliminary actions.

In block 304, in response to block 216 on FIG. 2, the sensor located at the desired network location receives the translated recording from the backend computing device to perform the testing procedure. The translated recording may be received as a single file or instruction-by-instruction. In some examples, end-point devices may operate in a continuous mode requesting new instruction as instructions are executed, this may be used by devices with limited storage, such as IoT devices. Instructions may contain a list of alternative instructions with defined priority consistent with earlier disclosure.

In block 306, the sensor may include the translated recording to a queue to be run. Queue, as used herein, refers to a list of instructions to be run in a specific order on a desired network. The queue use is not limited to line up various tests but may also be used to specify instruction order. In some examples, the sensor, may not have a queue and perform test "live" e.g. perform each instruction as it is received. The queue may also be used to schedule tests to run at a certain time, e.g. peak or off-peak hours.

In block 308, the sensor may instantiate a headless browser. Instantiating, as used herein, refers to executing all preliminary processes required to properly start up the headless browser. Headless browser, as used herein, refers to any type of an emulation tool (e.g. command line browser) used by the sensor to emulate user network activity. In some examples, the type of the headless browser may be specified by the user and included in the translated recording. Different sets of low-level instructions transmitted to the sensor may include use of a different headless browser, in this case another browser may be instantiated.

In block 310, the sensor executes the primary set of low-level instructions from the translated recording. Execution of a low-level instruction in the primary set of low-level instructions is performed once the queue reaches that instruction. As the instruction is executed, the sensor may begin collecting quantitative and qualitative metrics. Quantitative metrics, as used herein may refer to execution time, response time, timeout time or any other metric that may be measured. Qualitative metrics, as used herein may refer to error codes, output validation (e.g. filter produced correct output), input validation, or any other metric that may not be easily represented by a number.

Block 312 illustrates a possible failure of the low-level instruction executed in block 310. In the event of a failure, the sensor executes the secondary set of low-level instructions. The secondary set of low-level instructions may be provided by the backend computing device together with the primary set of low-level instructions. In some examples, the secondary set of low-level instructions may cause the sensor to instantiate another headless browser. In certain examples, and as discussed above in relation to FIG. 2, multiple alternative sets (i.e. sets that are additional to the secondary set) of low-level instructions may be available for a certain primary set of low-level instructions.

In block 314, the sensor may record collected quantitative and qualitative metrics in an activity log. Activity log, as used herein, refers to a file, a list, a database, or any other form of organized data structure. Activity log may be optimized, organized, encrypted, compressed, or otherwise processed by the sensor.

In block 316, the sensor may upload the activity log to the backend computing device. In some examples, the sensor may confirm upload of the activity log prior to archiving, purging, or otherwise removing the log from internal memory. In certain examples, the sensor may validate the activity log prior to uploading the log to the backend computing device. Validation of the activity log, as used herein, refers to error checking, hash checking or otherwise confirming validity and readability the log. Example method 300 illustrates a method for web flow reproduction. The method may comprise a plurality of blocks which may be encoded as instructions in a computer readable medium and executed on a sensor. Blocks may initiate a network performance analysis on the enterprise network; and receive a translated recording from a server to be executed as part of the network performance analysis. Additional blocks may add the translated recording to a set of tests in a queue to be executed on the enterprise network; and execute a primary set of low-level instructions of the translated recording using a headless browser. Further blocks may in response to a failed result of the primary set of low-level instructions, execute a secondary set of low-level instructions using the headless browser. Furthermore, blocks may, record, in an activity log, results of executing the translated recording, including at least a total execution time of the executed low-level instructions; and upload the activity log to the server.

With reference to method 300, activating a secondary low-level instruction may be based on a priority specified in the translated recording. Receiving the translated recording from the backend computing device may be performed on a by instruction basis. The backend computing device may be a cloud infrastructure. The low-level instructions may be written in a low-level programming language. The failed result may include: an error output, a timeout output, or any other unexpected output. Error output, as used herein, refers to error messages, warning messages, or any other indication of fault. Timeout output, as used herein, refers to no response messages, longer than expecting results, or any other messages indicating inconsistencies in the response timing. The headless browser is an environment that may be executed via a command-line interface or a network communication to mimic a web browser. The recording in the activity log may include a performance metric, an error code, an error definition, or any other informational data. Performance metric, as used herein, refers to loading time, response time, execution time, response status, success or failure of a request, or any other quantitative measurements. Error code, as used herein, refers to numeric error representation, link to error definition or any other reference to an error. Error definition, as used herein, refers to message containing error details or any other information pertinent to the error. Informational data, as used herein, refers to any other data related to the analysis. Translated recording may include at least two of the primary set and alternative sets of instructions. Network performance analysis may include gathering collecting quantitative and qualitative metrics related to the network. The set of tests may be a set of translated recordings executed as part of the network performance analysis. The primary and alternative sets of instructions may be based on a set of actions, wherein each action describing how the end user device performed a stage of a web application flow While not shown, methods 200 and 300 may be implemented to provide an as-a-service solution to end users. End users may be provided a sensor to be installed at the desired location and will be able to perform easily recorded testing flows by utilizing backend computing device. As-a-service model may bundle backend computing device services, such as translation of the flow recording into a low-level instruction and communication with the sensor. User will benefit from the ease of installation and maintenance of the testing solution. As-a-service provider will benefit from an all-encompassing flow testing solution which can be provided to the user without a need for support engineer to hard code testing procedures.

Described combination method of methods 200 and 300 may comprise a plurality of blocks which may be encoded as instructions in a computer readable medium and executed on a processor. Such method may be implemented as a network analysis system, the system including: a backend computing device (e.g., backend computing device 112 in FIG. 1) and an at least one sensor (e.g., sensors 122a and 122b in FIG. 1).

The backend computing device may include a memory with instructions and the first processor executing the instructions causing the backend computing device to receive, from an end user device, a recording of a web application flow, and partition the recording into a set of actions, each action describing how the end user device performed a stage of the flow, wherein partitioning comprises: parsing the recording to determine individual actions; and recording start and end points of the individual actions. The memory may further include instructions to translate an action of the set of actions into a first set of low-level instructions capable of being executed by a sensor, wherein translating the action comprises determining a user intent and selecting the first set of low-level instructions based on the user intent, and translate the action into a second set of low-level instructions capable of being executed by the sensor, wherein the second set of low-level instructions are selected based on the user intent and the second set of low-level instructions are scoped differently than the first set of low-level instructions. User intent, as used herein, refers to aim, objective, target, plan, desire, or any other purpose behind user actions. For example, user intent may be to send an email, upload a document, download a document, or any other action. In one example, if user actions resulted in downloading a document, first set of low-level instructions may follow user courser movements and click actions, while second set of low-level instructions may look at intent and directly run a downloadable link in a browser. Additionally, the memory may include instructions to assign a higher priority to the first set of low-level instructions and a lower priority to the second set of low-level instructions based on respective likelihoods of each set of low-level instructions successfully executing on an enterprise network, and produce a translated recording including the first set of low-level instructions as a primary set and the second set of low-level instructions as an alternative set, wherein the first set is included as the primary set based, in part, on the assigned higher priority, and wherein the second set is includes as the alternative set based, in part, on the assigned lower priority. Furthermore, the memory may include instructions to initiate a network performance analysis on the enterprise network, wherein the network performance analysis includes a test performed by executing the translated recording, and send the translated recording to the sensor to be executed as part of the network performance analysis.

The at least one sensor may include a memory with instructions and the second processor executing the instructions causing at least one sensor to receive the translated recording to be executed as part of the network performance analysis, and add the translated recording to a set of tests in a queue to be run on the enterprise network, wherein the set of tests are associated with the network performance analysis. The memory may further include instructions to execute the primary set of low-level instructions from the translated recording using a headless browser. Furthermore, the memory may include instructions to in response to a failed result of the execution of the primary set, execute the secondary set of low-level instructions using a headless browser. Additionally, the memory may include instructions to record, in an activity log, results of executing the translated recording, including at least a total execution time of the executed low-level instructions, and upload the activity log to the server. As described in the section above with reference to an example web application analysis system the actions may include an input action, a navigation action, a refresh action, a click action, or any other user action affecting the flow. The failed result may include: an error output, a timeout output, or any other unexpected output. The recording in the activity log may include a performance metric, an error code, an error definition, or any other quantitative or qualitive data.

FIG. 4 is an example of a graphical user interface (GUI) illustrating a collapsed view of a web application performance analysis 400. In some examples, GUI 400 may be generated (or otherwise produced) by the backend computing device and displayed (or otherwise shown) on an end user device.

In row 402 of an example GUI 400, hardware, network, service and any other details related to the testing procedure are displayed. Hardware details, as used herein, include sensor details such as sensor name, sensor serial number, location, or any other configuration information. Network details, as used herein, include desired network identification (e.g. network name), SSID, and any other network specific information. Hardware and network details may be received from a sensor, such as sensor 122 of FIG. 1. Backend computing device may collect, store, update, and otherwise keep information current and available for display on GUI 400. Service details, as used herein, include information related to the analyzed web service (e.g. webmail, WebApp, CRM, etc.) information may include service location, service authentication credential, or any other information relevant to the performed analysis.

In row 404 of an example GUI 400, testing procedure details are displayed. Testing procedure, as used herein refers to tests, assessments, analysis or any other similar procedure. Testing procedure details may include type of testing procedure (e.g. performance analysis), type of service being tested (e.g. WebApp), and any other relevant information. Testing procedure may be selected by the end user and/or support engineer or determined by the backend computing device based on the submitted flow recording.

In row 406 of an example GUI 400, elements of an activity log are displayed. Elements may include as displayed: (1) an interface the test is utilizing; (2) execution time of each step of the recording; (3) status of the step performed; (4) brief description of the status; (5) tasks associated with each step; (6) target of the performed step. While not shown additional relevant elements may be displayed. GUI 400, may be sorted or filtered based on element values.

In row 408 of an example GUI 400, detailed testing procedure information is provided. Detailed information is collected by the sensor, such as endpoint device 122 shown in FIG. 1. After collection, detailed information is transmitted to a backend computing device, such as backend computing device 112 shown in FIG. 1. Each step may be expanded and additional details may be viewed as illustrated by an example in FIG. 5.

FIG. 5 is an example of a graphical user interface (GUI) illustrating an expanded view of a web application performance analysis 500. In some examples, GUI 500 may be generated (or otherwise produced) by the backend computing device and displayed (or otherwise shown) on an end user device.

In row 502 of an example GUI 500, detailed testing procedure information is provided consistent with earlier disclosure as described with relation to FIG. 4. GUI 500, illustrates an example of an expanded detailed view. Expanded view provides end user and/or support engineer with additional insights on performed testing procedures.

In row 504 of an example GUI 500, timing information is displayed. Timing information, as used herein, refers to execution time, processing time, or any other timing metric. Timing may be displayed for each of the individual blocks or grouped together.

In row 506 of an example GUI 500, timestamp is displayed. Timestamp, as used herein, refers to the time/date specific test is run. Timestamp may be based on the start or end time of the testing procedure, based on the configuration by the end user and/or support engineer. Timestamp may indicate start/end points for each step of the testing procedure.

In row 508 of an example GUI 500, raw output of the testing procedure is provided. Raw output is based on the translated recording and may include alternative instructions as illustrated. Raw output may be exported by the user. Raw output may include all data used to populate row 502 and any additional data related to the testing procedure. In some examples raw output may be provided in a form of a diagrammatic representation of the data, such as a table or a visual network representation.

Figure 6:
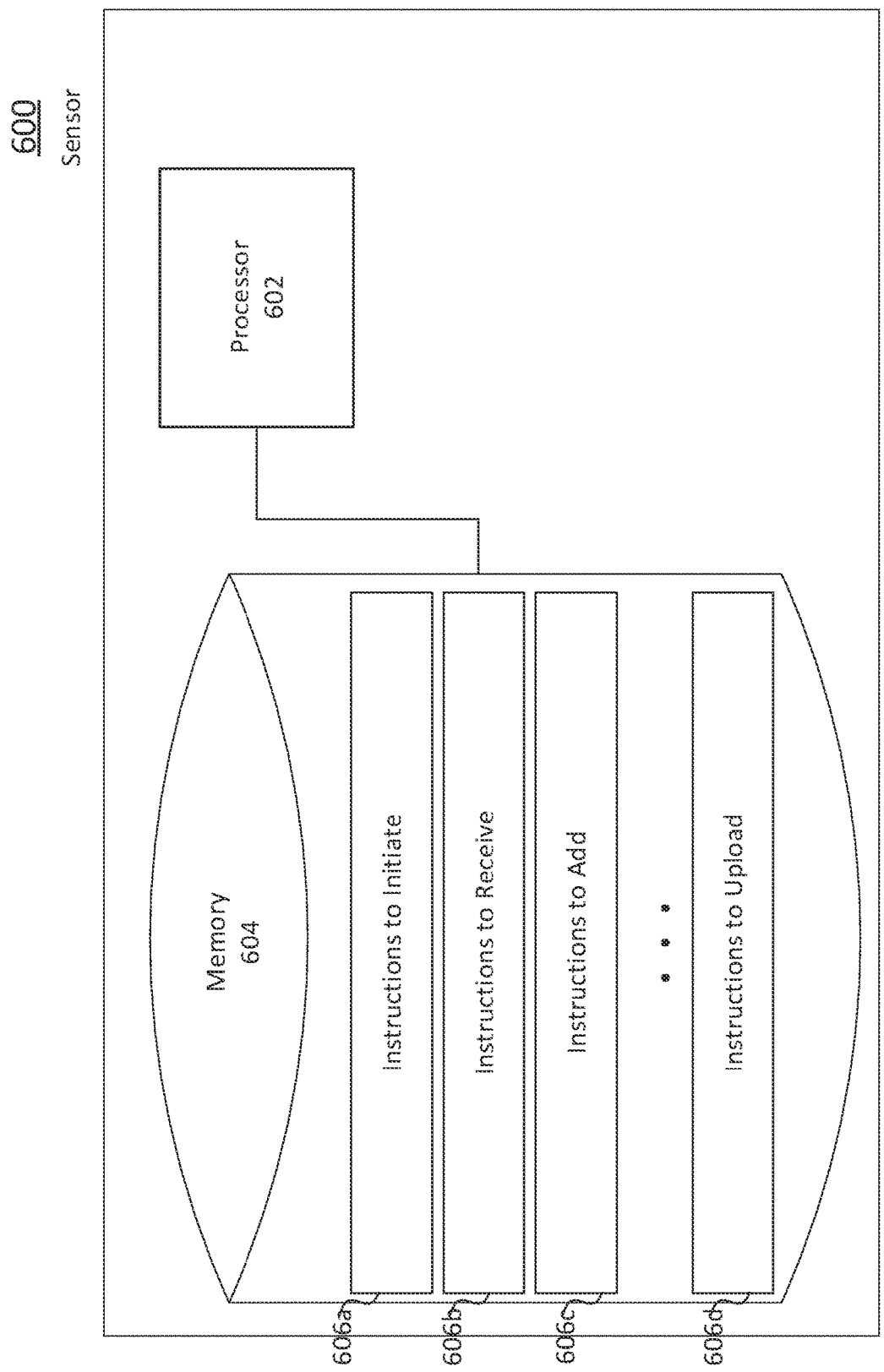
FIG. 6 is an example sensor configured to reproduce a flow on a desired network.

FIG. 6 is an example sensor configured to reproduce recorded web application performance analysis on a desired network. Sensor 600 includes processor 602 and memory 604. Memory 604 includes instructions 606 that, when executed by processor 602, cause sensor 600 to perform certain tasks.

Instructions 606a cause sensor 600 to initiate a performance analysis, or any other testing procedure related to the recorded flow on a desired network, consistent with the earlier disclosure.

Instructions 606b cause sensor 600 to receive the translated recording from a backend computing device, such as backend computing device 112 illustrated in FIG. 1 to perform testing procedure, consistent with the earlier disclosure.

Instructions 606c cause sensor 600 to add the translated recording to the queue to be run, consistent with the earlier disclosure.

In some examples, additional instructions not shown in FIG. 6 cause sensor 600 to instantiate a headless browser and to activate a primary low-level instruction from the translated recording, consistent with the earlier disclosure In some examples, additional instructions not shown in FIG. 6 cause sensor 600 in the event of the failure, to activate an alternative low-level instruction and to record collected quantitative and qualitative metrics in an activity log, consistent with the earlier disclosure.

Instructions 606d cause sensor 600, to upload the activity log to the backend computing device.

End user devices and sensors are types of client devices. As used herein, a client device is a computing device that is operated or accessed by a network user. Client devices include laptop/desktop computers, tablets/phones/PDAs, servers, Internet of Things devices, sensors, or any other type of a computing device.

Backend computing device (also referred to as "server"), as used herein, refers to computing infrastructure used to achieve large scale computing tasks efficiently and quickly. A backend computing device may be any number, type, or combination of physical and virtualized devices as is beneficial to executing the relevant computing tasks. Backend computing devices may be in a cloud environment, datacenter environment, storage environment, or any other environment or combination thereof that provides network access to computing resources. Computing resources include storage resources, computational resources, graphic processing resources, or any other resources required for performance of a given task on a computing device.

A processor is any type of processing circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

Interface is any type of input/output (I/O) mechanism, interface may be hardware, software, or a combination thereof that provide read or read/write access. Interface may include network communication interface to communicate via wired or wireless connection. Interface may further include generic I/O devices such as keyboard, mouse, printer, monitor or any other type of an I/O device. Interfaces may communicate to one another through ethernet, Wi-Fi, Bluetooth, or any other appropriate technology. Interfaces may use variety of protocols for communication, such as TCP, UDP, TCP/IP or any other appropriate protocol.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The foregoing description has been presented for purposes of illustration. It is not exhaustive and is not limited to the precise forms or examples disclosed. Modifications and adaptations of the examples will be apparent from consideration of the specification and practice of the disclosed embodiments. For example, the described implementations include hardware and software, but systems and methods consistent with the present disclosure may be implemented as hardware alone.

It is appreciated that the above described examples can be implemented by hardware, or software (program codes), or a combination of hardware and software. If implemented by software, it can be stored in the above-described computer-readable medium. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

The block diagrams in the figures illustrate the architecture, functionality, and operation of possible implementations of systems, methods, and computer hardware or software products according to various examples. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

Other examples will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

The invention claimed is:

1. A method for testing a network, comprising:
receiving, at a backend computing device and from an end user device, a recording of a web application flow;
partitioning the recording into a set of actions, each action describing how the end user device performed a stage of the flow;
translating an action of the set of actions into a first set of low-level instructions to be executed by a sensor;
translating the action into a second set of low-level instructions to be executed by the sensor;
assigning a higher priority to the first set of low-level instructions and a lower priority to the second set of low-level instructions based on likelihoods of success, wherein the likelihoods of success reflect overall viability of each set of low-level instructions;
producing a translated recording including the first set of low-level instructions as a primary set and the second set of low-level instructions as a secondary set, wherein the first set is included as the primary set based, in part, on the assigned higher priority;
initiating a network performance analysis on the network, wherein the network performance analysis includes a test performed by executing the translated recording; and
sending the translated recording to the sensor to be executed as part of the network performance analysis.

2. The method of claim 1, wherein the web application flow represents a user interaction with a web application.

3. The method of claim 1, wherein:
the recording is formatted in a high-level programming language; and
the first and second sets of low-level instructions are formatted in a low-level programming language.

4. The method of claim 1, wherein the actions comprise at least one of: an input action, a navigation action, a refresh action, or a click action.

5. The method of claim 1, wherein the partitioning comprises:
parsing the recording to determine individual actions; and
recording start and end points of the individual actions.

6. The method of claim 1, wherein translating comprises:
determining a result of the action; and
producing a low-level action or a combination of low-level action producing the result.

7. The method of claim 1, wherein the likelihood of success is a compound metric reflecting overall viability of the low-level instruction.

8. The method of claim 1, wherein the translated recording further comprises an additional set of low-level instructions different from the primary set and the secondary set.

9. A network analysis system, comprising:
a backend computing device comprising a first processor configured to:
receive, from an end user device, a recording of a web application flow,
partition the recording into a set of actions, each action describing how the end user device performed a stage of the flow, wherein partitioning comprises:
parsing the recording to determine individual actions; and
recording start and end points of the individual actions,
translate an action of the set of actions into a first set of low-level instructions to be executed by a sensor, wherein translating the action comprises determining a user intent and selecting the first set of low-level instructions based on the user intent,
translate the action into a second set of low-level instructions to be executed by the sensor, wherein the second set of low-level instructions are selected based on the user intent and the second set of low-level instructions are scoped differently than the first set of low-level instructions,
assign a higher priority to the first set of low-level instructions and a lower priority to the second set of low-level instructions based on likelihoods of each set of low-level instructions successfully executing on an enterprise network, wherein the likelihoods of each set of low-level instructions successfully executing reflects overall viability of each set of low-level instructions,
produce a translated recording including the first set of low-level instructions as a primary set and the second set of low-level instructions as a secondary set, wherein the first set is included as the primary set based, in part, on the assigned higher priority, and wherein the second set is includes as the secondary set based, in part, on the assigned lower priority,
initiate a network performance analysis on the enterprise network, wherein the network performance analysis includes a test performed by executing the translated recording, and
send the translated recording to the sensor to be executed as part of the network performance analysis; and
the sensor comprising a second processor configured to:
receive the translated recording to be executed as part of the network performance analysis,
add the translated recording to a set of tests in a queue to be run on the enterprise network, wherein the set of tests are associated with the network performance analysis,
execute the primary set of low-level instructions from the translated recording using a headless browser,
in response to a failed result of the execution of the primary set, execute the secondary set of low-level instructions using the headless browser,
record, in an activity log, results of executing the translated recording, including at least a total execution time of the executed low-level instructions, and
upload the activity log to the backend computing device.

10. The system of claim 9 wherein the actions comprise at least one of: an input action, a navigation action, a refresh action, or a click action.

11. The system of claim 9, wherein the failed result comprises at least one of: an error output, a timeout output, or an unexpected output.

12. The system of claim 9, wherein the recording in the activity log further comprises at least one of: a performance metric, an error code, an error definition, or informational data.

* * * * *